J. W. McGOWAN.
VEHICLE ALARM.
APPLICATION FILED SEPT. 30, 1918.

1,328,173.

Patented Jan. 13, 1920.
2 SHEETS—SHEET 1.

Inventor,
James W. McGowan
By Mason Fenwick Lawrence
Attys.

J. W. McGOWAN.
VEHICLE ALARM.
APPLICATION FILED SEPT. 30, 1918.

1,328,173.

Patented Jan. 13, 1920.
2 SHEETS—SHEET 2.

Inventor,
James W. McGowan
By
Attys.

UNITED STATES PATENT OFFICE.

JAMES W. McGOWAN, OF OMAHA, NEBRASKA.

VEHICLE-ALARM.

1,328,173.  Specification of Letters Patent.  Patented Jan. 13, 1920.

Application filed September 30, 1918. Serial No. 256,346.

*To all whom it may concern:*

Be it known that I, JAMES W. McGOWAN, a citizen of the United States, residing at Omaha, in the county of Douglas and State of Nebraska, have invented certain new and useful Improvements in Vehicle-Alarms; and I do hereby declare the following to be a full, clear, and exact description of the invention, such as will enable others skilled in the art to which it appertains to make and use the same.

This invention relates to vehicle alarms and has for an object to provide an alarm which may be applied to a vehicle which will be sounded when the vehicle is moved irrespective of the motive power applied to the vehicle and which is so positioned that it can not be easily or conveniently tampered with by unauthorized persons.

A further object of the invention is to provide an alarm especially adapted for auto-vehicles having moving parts connected with some of the parts of the vehicle which move irrespective of the movement of the power plant whereby any movement by manual or animal power will at once sound the alarm.

A further object of the invention is to provide in a vehicle alarm the various details of construction for promptly carrying into effect the main object of the invention.

With these and other objects in view the invention comprises certain novel features of construction, combination and arrangement of parts as will be hereinafter more fully described and claimed.

In the drawing.

Like characters of reference indicate corresponding parts throughout the several views.

Figure 1:
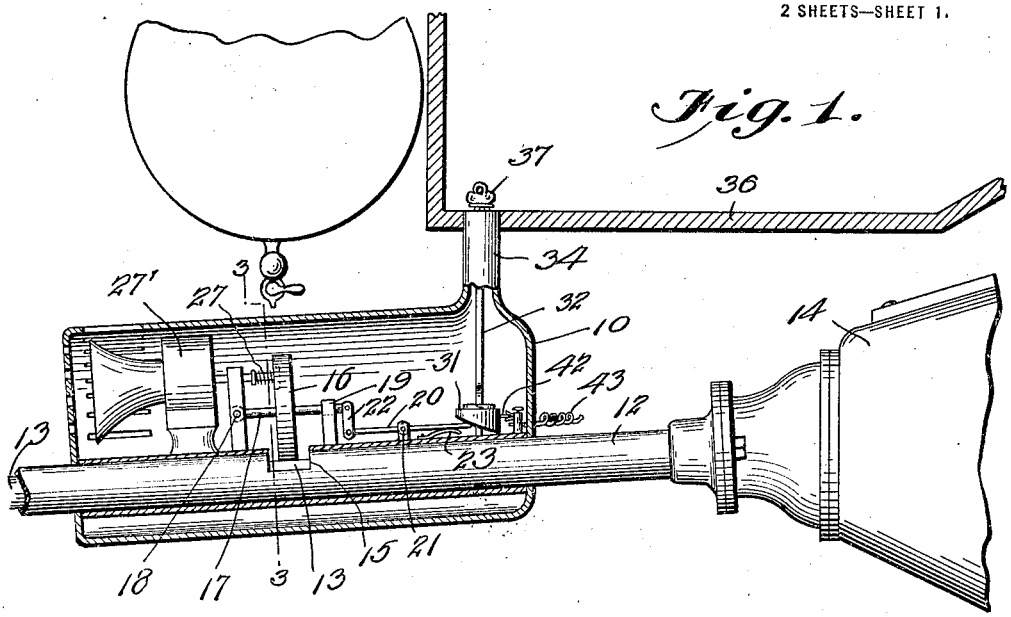
Figure 1 is a view in vertical section of the improved alarm mechanism applied to a conventional automobile transmission mechanism.
Figure 2:
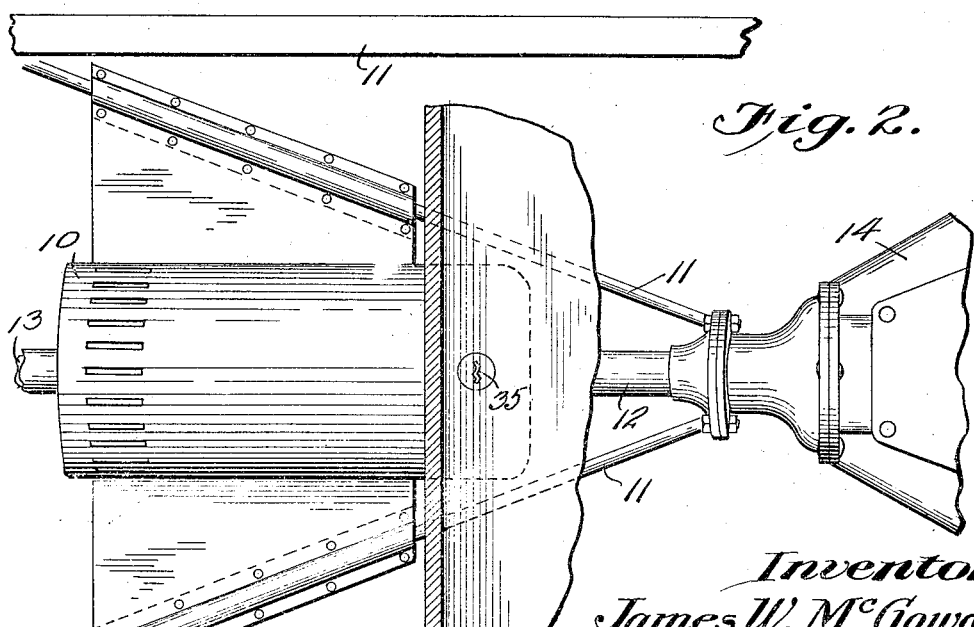
Fig. 2 is a top plan view of the alarm mechanism applied to an automobile chassis.
Figure 3:
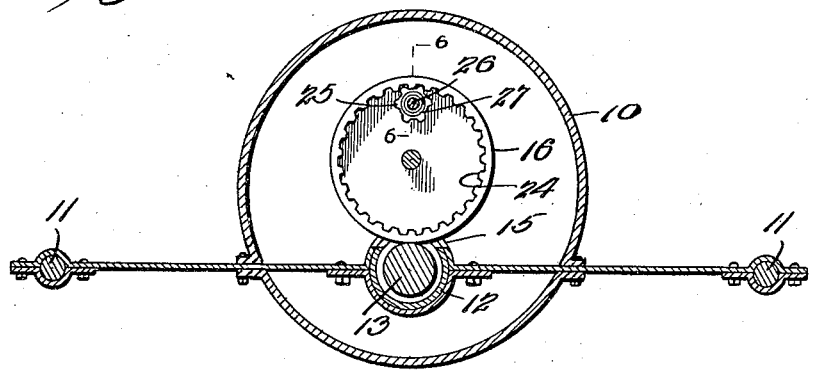
Fig. 3 is a transverse sectional view through the alarm mechanism taken on line 3—3 of Fig. 1.

The improved alarm mechanism which forms the subject matter of the present application comprises a casing or housing 10 adapted to be secured to the chassis of an automobile indicated at 11.

The housing 10 surrounds the casing 12 which in turn surrounds the shaft 13 of the transmission mechanism from the power plant indicated conventionally at 14 to the rear axle.

It is to be understood that instead of attaching to and taking power from the drive shaft 13 the rear axle may be employed in like manner without change of construction.

The housing 12 of the drive shaft 13 is cut away as indicated at 15 and a friction disk 16 positioned to bear directly upon and receive rotary motion from the drive shaft 13.

The friction disk 16 is mounted in any approved manner to be lifted out of engagement with the drive shaft 13 when it is desired to disconnect the mechanism from the moving parts. As shown in the drawing the said disk 16 is journaled upon a shaft 17 pivoted at 18 and slidable relative to a keeper 19. In the position shown at Fig. 1 the disk 16 is in engagement with the driving shaft 13 but when the journal shaft 17 is raised the disk 16 is moved slightly out of engagement with and does not receive motion from the drive shaft 13.

To raise the disk 16 a lever 20 is provided fulcrumed at 21 and connected with the shaft 17 by a link 22 and a spring 23 normally tending to hold the disk 16 in frictionable engagement with the shaft 13. When in such position the friction disk 16 which is a gear disk as indicated at 24, actuates a pinion 25 which is mounted upon a shaft 26 which when rotated actuates the alarm mechanism 27'. The alarm mechanism is of any usual and ordinary type and the detail is not herein shown.

The mounting of the pinion 25 upon the shaft 26 is by means of a helical spring 27 surrounding the shaft 26 engaged by a collar 28 fixed upon the said shaft at one end and with its opposite end as at 29 engaged by the pinion 25. A pin 30 is carried by the shaft 26 in position to be engaged by the part 29 of the spring when the spring has been rotated to a sufficient extent to engage such pin. This construction prevents the actuation of the alarm from a slight bump or a very limited movement of the vehicle.

Figure 5:
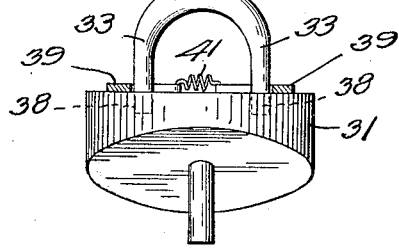
Fig. 5 is a view of the locking disk and actuating spindle in side elevation showing line 4—4 as in the position of Fig. 4.

Bearing upon the end of the lever 20 opposite the link 22 is a locking disk 31 having a cam face 32 indicated more particularly at Fig. 5. As shown at Fig. 1 the cam disk 31 is in position to permit the disk 16 to be maintained in engagement with the shaft 13 by the spring 23. When the cam disk 31 is rotated the end of the lever 20 opposite the link 22 is depressed raising the shaft 17 and therewith the disk 16 out of engagement with the shaft 13.

To rotate the cam disk 31 a spindle 32 is employed having bifurcated extremities as indicated at 33, the spindle extending upwardly through a branch 34 of the housing 10 and provided upon its upper end with a key-receiving socket preferably flush with the floor of the automobile indicated at 36 and actuated by a key 37.

Figure 4:
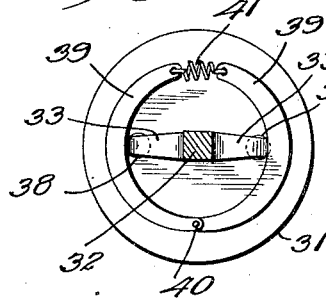
Fig. 4 is a top plan view of the connection between the locking disk and its actuating spindle.
Figure 6:
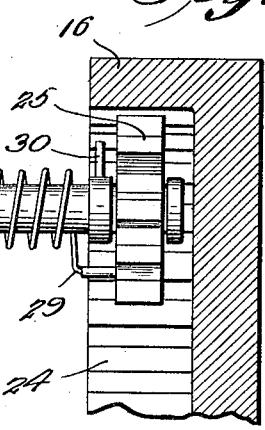
Fig. 6 is a sectional view taken on line 6—6 of Fig. 3.

To prevent the removal of the lock spindle 32 and the insertion of some instrument for rotating the disk 31 the bifurcated ends 33 of the said spindle 32 are simply inserted in the depressions in the disk 31 as indicated at Figs. 4 and 5. If the spindle 32 is bent or otherwise dislocated from the disk 31 cover members 39 are employed which are pivoted to the disk 31 at 40 and actuated by spring 41 so that when the bifurcated ends 33 are removed from the socket the said cover members 39 will be moved by the spring 41 to cover the depression 38 and prevent the insertion of any unauthorized tool for the purpose of rotating the disk 31.

The disk 31 is also provided with a finger 42 as shown at Fig. 1 which forms connection with the electric wire 43 from the magneto grounding the magneto and preventing the starting of the car when the parts are in the position shown at Fig. 1 and only when the locking disk has been rotated to lift the friction disk 31 from contact with the shaft 13 and disconnect the finger 42 from electrical connection. This is to prevent the actual owner of the car from forgetfully starting his car with the alarm mechanism in the position of being actuated and insuring proper disconnection of the alarm mechanism from the actuating parts before the car can be started.

While of course the electric connection from the magneto to the ground forms no actual part of the present invention it is a desirable adjunct whereby the alarm mechanism is made more convenient for practical operation.

It is believed that the operation of the device will be fully and clearly understood from the description of the several parts and their operation hereinbefore contained.

I claim:

1. The combination with a vehicle having a driving shaft in positive connection with the wheels of the vehicle, an alarm mechanism mounted adjacent to the driving shaft, a friction disk in engagement with the driving shaft and adapted to actuate the alarm mechanism without regard to the direction of rotation and manual means for lifting the friction disk out of frictional engagement with the driving shaft and private means for rendering said alarm inoperative.

2. The combination with a vehicle having a driving shaft in positive engagement with the wheels, a disk in frictional engagement with the driving shaft adapted to actuate an alarm without regard to the direction of rotation, a lever mounted to lift the axis of the friction disk to disengage it from the driving shaft and a key actuated cam adapted to actuate the lever and private means for rendering said alarm inoperative.

3. The combination with a vehicle having a part moving with each movement of the vehicle, of a mechanically operated alarm mounted upon the vehicle, and provided with movable parts engaging with the moving parts of the vehicle and actuating said alarm on movement of said vehicle irrespective of direction, and private means for rendering said alarm inoperative.

4. The combination with a vehicle having a part moving with each movement of the vehicle, of a mechanically operated alarm, and means for operating said alarm comprising, a rotatable member, means for driving said rotatable member from said moving part, means for operating said mechanical alarm irrespective of the direction of rotation driven by said rotatable member, and means for moving said rotatable member into and out of engagement with said driving means and private means for rendering said alarm inoperative.

5. The combination with a vehicle having a driving shaft in positive engagement with the wheels, a mechanical alarm, a rotatable member in engagement with the driving shaft adapted to actuate said alarm irrespective of the direction of rotation, a lever adapted to lift the axis of said rotatable member to disengage it from the shaft, and a key operated cam adapted to actuate said lever and private means for rendering said alarm inoperative.

6. The combination with a vehicle having a part moving with each movement of the vehicle, of a mechanically operated alarm, and means for operating said alarm comprising, a rotatable member, means for driving said rotatable member from said moving part, means for operating said mechanical alarm driven by said rotatable member comprising a shaft connected to said alarm and means carried by said rotatable member for rotating said shaft and private means for rendering said alarm inoperative.

7. The combination with a vehicle having a part moving with each movement of the vehicle, of a mechanically operated alarm, and means for operating said alarm comprising, a rotatable member, means for driving said rotatable member from said moving part, means for operating said mechanical alarm driven by said rotatable member comprising a shaft connected to said alarm, gear teeth carried by said rotatable member and a pinion mounted on said shaft and capable of a limited rotation thereon and engaging the teeth on said rotatable member and private means for rendering said alarm inoperative.

8. The combination with a vehicle having a part moving with each movement of the vehicle, of a mechanically operated alarm, and means for operating said alarm comprising, a rotatable member, means for driving said rotatable member from said moving part, means for operating said mechanical alarm driven by said rotatable member, comprising a shaft connected to said alarm, gear teeth carried by said rotatable member, a pinion loosely mounted on said shaft and engaging said teeth, a coiled spring mounted on said shaft and secured at one end and having an extension on the other end secured to said pinion and a pin on said shaft adapted to engage said extension when the pinion is rotated.

9. The combination with a vehicle having a rotary member, of a friction annulus for engagement with a rotary part of said vehicle, an internal gear on said annulus for engaging a pinion and operating an alarm, and means for throwing said mechanism in and out of rotating engagement with said rotary part of said vehicle.

10. The combination with a vehicle having a rotary member, of a friction annulus for engagement with a rotary part of said vehicle, an internal gear on said annulus for engaging a pinion and operating an alarm and means for throwing said mechanism in and out of rotating engagement with said rotary part of said vehicle, and means for preventing the operation of said alarm except when the vehicle is actually traveling.

11. The combination with a vehicle having a rotary member, of a friction annulus for engagement with a rotary part of said vehicle, an internal gear on said annulus for engaging a pinion and operating an alarm, means for throwing said mechanism in and out of rotating engagement with said rotary part of said vehicle, and means for automatically stopping the vehicle prior to the operation of said alarm.

12. In combination, a rotary member in a vehicle, an ignition system for operating said vehicle, an alarm and means for actuating said alarm by said rotary member, and means for stopping the operation of said ignition system prior to the operation of said alarm.

13. In combination, a rotary member in a vehicle, a unitary housing incasing said rotary member and projecting through the floor of said vehicle, and means within said housing for operating an alarm and the engagement of said operating means by a key inserted into said housing.

14. In combination, a rotary member in a vehicle, an alarm actuated by an engagement with said rotary member, private means for rendering said alarm operative or inoperative, and means for automatically preventing the operation of said alarm during a partial movement of said rotary member.

In testimony whereof I affix my signature.

JAMES W. McGOWAN.